United States Patent
Nordbruch

(10) Patent No.: US 10,867,514 B2
(45) Date of Patent: Dec. 15, 2020

(54) METHOD AND SYSTEM FOR SUPPORTING DRIVERLESS DRIVING OF A MOTOR VEHICLE IN A PARKING FACILITY HAVING A PLURALITY OF PARKING SPACES

(71) Applicant: Robert Bosch GmbH, Stuttgart (DE)

(72) Inventor: Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 164 days.

(21) Appl. No.: 16/212,947

(22) Filed: Dec. 7, 2018

(65) Prior Publication Data
US 2019/0180618 A1    Jun. 13, 2019

(30) Foreign Application Priority Data

Dec. 13, 2017 (DE) .................... 10 2017 222 658

(51) Int. Cl.
*G08G 1/14* (2006.01)
*G01C 21/34* (2006.01)
(Continued)

(52) U.S. Cl.
CPC ........... *G08G 1/14* (2013.01); *B62D 15/0285* (2013.01); *G01C 21/20* (2013.01); *G01C 21/34* (2013.01);
(Continued)

(58) Field of Classification Search
CPC .... G08G 1/14; G01C 21/362; G01C 21/3685; G01C 21/20; G01C 21/34; G01C 21/3407;
(Continued)

(56) References Cited

U.S. PATENT DOCUMENTS 10,156,848 B1 * 12/2018 Konrardy ............... G01C 21/34
2010/0156672 A1    6/2010 Yoo et al.
(Continued)

FOREIGN PATENT DOCUMENTS

DE    102013213379 A1    1/2015
DE    102014224113 A1    6/2016
DE    102015204359 A1    9/2016

*Primary Examiner* — Marthe Y Marc-Coleman
(74) *Attorney, Agent, or Firm* — Norton Rose Fulbright US LLP; Gerard Messina

(57) ABSTRACT

A method is described for supporting a driverless driving of a motor vehicle in a parking facility having a plurality of parking spaces, including the following steps: monitoring the state of occupancy of each of the plurality of parking spaces in order to ascertain free parking spaces, ascertaining a parking space for the motor vehicle based on the monitoring of the state of occupancy of each of the plurality of parking spaces, so that a first route from a motor vehicle drop-off area of the parking facility to the ascertained parking space is determined as a function of the monitoring of the state of occupancy of each of the plurality of parking spaces, communication of remote control commands corresponding to the determined first route to the motor vehicle via a wireless communication network, in order to guide the motor vehicle from the motor vehicle drop-off area to the ascertained parking space in at least partially remote-controlled fashion, and/or communication of the determined first route to the motor vehicle via the wireless communication network so that based on the determined first route the motor vehicle can drive at least partially autonomously from the motor vehicle drop-off area to the ascertained parking space. Also described is a corresponding system, to a parking facility, and to a computer program.

17 Claims, 2 Drawing Sheets

(51) Int. Cl.
*G01C 21/20* (2006.01)
*B62D 15/02* (2006.01)
*G01C 21/36* (2006.01)
*G05D 1/00* (2006.01)

(52) U.S. Cl.
CPC ....... *G01C 21/362* (2013.01); *G01C 21/3685* (2013.01); *G05D 1/0088* (2013.01); *G05D 2201/0213* (2013.01)

(58) Field of Classification Search
CPC ............. B62D 15/0285; G05D 1/0088; G05D 2201/0213
See application file for complete search history.

(56) References Cited

U.S. PATENT DOCUMENTS

| | | | |
|---|---|---|---|
| 2012/0056758 | A1 | 3/2012 | Kuhlman et al. |
| 2015/0369618 | A1* | 12/2015 | Barnard .................. H04W 4/40 701/491 |
| 2016/0240080 | A1* | 8/2016 | Nordbruch ............. G08G 1/015 |
| 2016/0247327 | A1* | 8/2016 | Kozawa ................ G06Q 10/06 |
| 2017/0144654 | A1* | 5/2017 | Sham .................... G05D 1/0088 |
| 2017/0255881 | A1* | 9/2017 | Ritch ............... G08G 1/096883 |
| 2017/0267233 | A1* | 9/2017 | Minster .................. B62D 15/02 |
| 2018/0121833 | A1* | 5/2018 | Friedman ........... G06Q 10/0631 |
| 2018/0164817 | A1* | 6/2018 | Herz .................. G01C 21/3685 |

\* cited by examiner

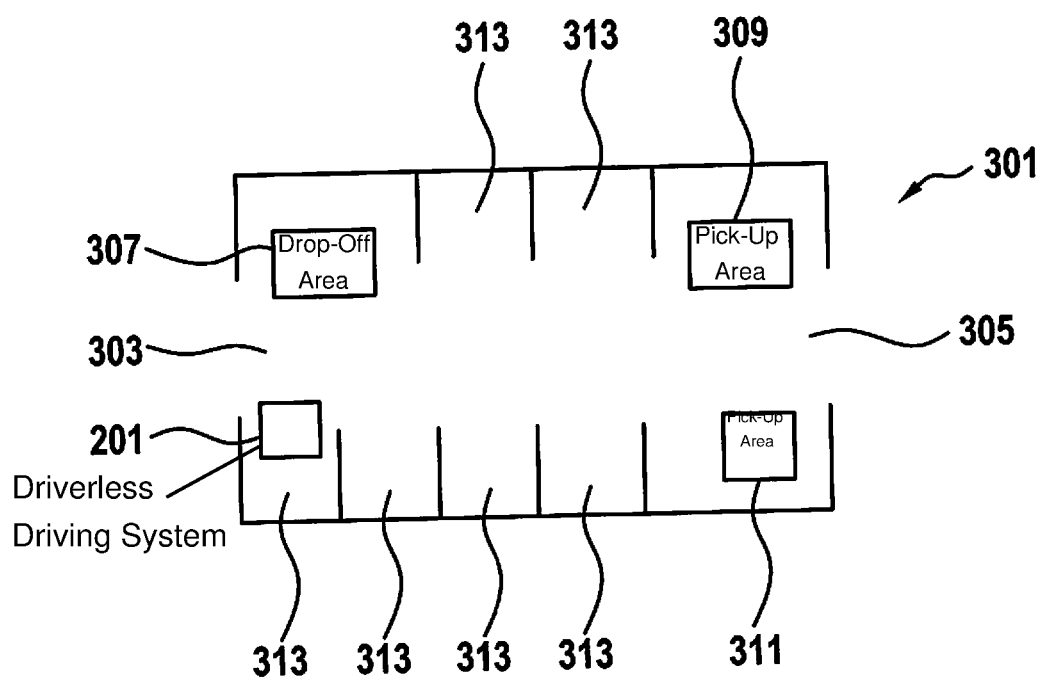

METHOD AND SYSTEM FOR SUPPORTING DRIVERLESS DRIVING OF A MOTOR VEHICLE IN A PARKING FACILITY HAVING A PLURALITY OF PARKING SPACES

FIELD OF THE INVENTION

The present invention relates to a method and a system for supporting driverless driving of a motor vehicle in a parking facility having a plurality of parking spaces. The present invention further relates to a parking facility for motor vehicles, and to a computer program.

BACKGROUND INFORMATION

German Published Patent Application No. 10,2013/213,379 describes a device and a method for supporting a driver when driving a vehicle into and out of a parking space in a parking facility.

SUMMARY

An object of the present invention is to provide a design for the efficient supporting of a driverless driving of a motor vehicle in a parking facility having a plurality of parking spaces.

According to a first aspect, a method is provided for supporting a driverless driving of a motor vehicle in a parking facility having a plurality of parking spaces, including the following steps: monitoring the state of occupancy of each of the plurality of parking spaces in order to ascertain free parking spaces, ascertaining a parking space for the motor vehicle based on the monitoring of the state of occupancy of each of the plurality of parking spaces, so that as a function of the monitoring of the state of occupancy of each of the plurality of parking spaces a first route is determined from a vehicle drop-off area of the parking facility to the ascertained parking space, communicating remote control commands corresponding to the determined first route to the motor vehicle via a wireless communication network, in order to guide the motor vehicle at least partly in remote-controlled fashion from the motor vehicle drop-off area to the ascertained parking space, and/or communicating the determined first route to the motor vehicle via the wireless communication network, so that based on the determined first route the motor vehicle can drive at least partially autonomously from the motor vehicle drop-off area to the ascertained parking space.

According to a second aspect, a system is provided for supporting a driverless driving of a motor vehicle in a parking facility having a plurality of parking spaces, including:

a monitoring device for monitoring the state of occupancy of each of the plurality of parking spaces in order to ascertain free parking spaces, a processor device for ascertaining a parking space for the motor vehicle based on the monitoring of the state of occupancy of each of the plurality of parking spaces, the processor device being designed to determine a first route from a motor vehicle drop-off area of the parking facility to the ascertained parking space as a function of the monitoring of the state of occupancy of each of the plurality of parking spaces, a communication interface for communicating remote control commands corresponding to the determined first route to the motor vehicle via a wireless communication network, in order to guide the motor vehicle from the motor vehicle drop-off area to the ascertained parking space in at least partly remote-controlled fashion, and/or communicating the determined first route to the motor vehicle via the wireless communication network so that, based on the determined first route, the motor vehicle can drive at least partially autonomously from the motor vehicle drop-off area to the ascertained parking space.

According to a third aspect, a parking facility for motor vehicles is provided having the system according to the present invention.

According to a fourth aspect, a computer program is provided that includes program code for carrying out the method according to the present invention when the computer program is executed on a computer, for example on the processor device of the system according to the present invention.

The present invention is based on the finding that the above object can be achieved by carrying out the ascertaining of the first route from the motor vehicle drop-off area to one of the plurality of parking spaces as a function of the monitoring of the state of occupancy of each of the plurality of parking spaces.

In this way, for example the technical advantage is brought about that the first route can be efficiently determined. Thus, advantageously, the motor vehicle can be efficiently supported indirectly during driverless driving inside the parking facility, via the communication of the corresponding remote-control commands or of the determined first route to the motor vehicle via the wireless communication network.

In the sense of the present invention, a motor vehicle drop-off area designates an area inside the parking facility that is provided so that a driver of a motor vehicle can leave the motor vehicle there for an automatic parking process.

An automatic parking process is also known for example as automated valet parking (AVP).

According to a specific embodiment, the ascertained parking space is a currently free parking space, or is a parking space that is currently occupied or reserved but that will be free at the time of arrival of the motor vehicle at the parking space. The time of arrival is for example estimated or predicted.

According to a specific embodiment, the parking facility includes a parking area and/or a parking garage and/or an underground parking garage.

According to a further specific embodiment, it is provided that the first route is determined temporally before or during or after an arrival of the motor vehicle at the motor vehicle drop-off area.

In this way, for example the technical advantage is brought about that the first route can be determined at different times. In particular if the first route is determined temporally before the arrival of the motor vehicle at the motor vehicle drop-off area, for example the technical advantage is brought about that the first route is already determined when the motor vehicle arrives at the motor vehicle drop-off area. This means for example that according to this specific embodiment the first route is determined while the motor vehicle is traveling to the parking facility. In this way, in addition, in particular the technical advantage is brought about that an AVP process can be started without a temporal delay after the arrival of the motor vehicle at the motor vehicle drop-off area.

An arrival time of the motor vehicle at each of the plurality of parking spaces is predicted, it being checked whether the corresponding parking space is free at the respective predicted arrival time, and the parking place for the motor vehicle being selected from the parking spaces that are free at the respective predicted arrival time.

In this way, for example the technical advantage is brought about that the parking space can be efficiently ascertained.

According to another specific embodiment, it is provided that the ascertained parking space is identified as reserved in a digital occupancy state map of the parking facility.

In this way, for example the technical advantage is brought about that the ascertained parking space is not provided for parking another motor vehicle.

According to a specific embodiment, a signal is issued indicating that the ascertained parking space is reserved.

In this way, for example the technical advantage is brought about that for example traffic participants inside the parking facility can be efficiently informed that the ascertained parking space is reserved.

A signaling includes for example a visual and/or an acoustic signaling.

A signaling includes for example sending a message, via a wireless and/or wire-bound communication network, stating that the ascertained parking space is reserved.

A signaling includes in particular a blocking of the ascertained parking space by a physical object, for example a barrier.

According to another specific embodiment, it is provided that the parking facility includes a plurality of motor vehicle pickup areas whose state of occupancy is monitored, further including the following steps:

ascertaining a motor vehicle pickup area for the motor vehicle based on the monitoring of the state of occupancy of each of the plurality of motor vehicle pickup areas, so that, as a function of the monitoring of the state of occupancy of each of the plurality of motor vehicle pickup areas, a second route from the ascertained parking space to the ascertained motor vehicle pickup area is determined, communicating remote control commands corresponding to the determined second route to the motor vehicle via a wireless communication network, in order to guide the motor vehicle at least partially in remote-controlled fashion from the ascertained parking space to the ascertained motor vehicle pickup area, and/or communicating the determined second route to the motor vehicle via the wireless communication network, so that the motor vehicle can drive at least partly autonomously from the ascertained parking space to the ascertained motor vehicle pickup area based on the determined first route.

In this way, for example the technical advantage is brought about that the second route can be efficiently determined. Thus, it is in particular provided that the second route is determined based on the monitoring of the state of occupancy of each of the plurality of motor vehicle pickup areas. In this way, for example the technical advantage is brought about that it can be ensured that the motor vehicle is guided to a free motor vehicle pickup area.

According to a specific embodiment, the ascertained motor vehicle pickup area is a currently free motor vehicle pickup area or a motor vehicle pickup area that is currently occupied or reserved, but that will be free at the time of an arrival of the motor vehicle at the motor vehicle pickup area. The time of arrival is for example estimated or predicted.

According to another specific embodiment, it is provided that the second route is determined temporally before or during or after an arrival of the motor vehicle at the motor vehicle pickup area, or at the end of the parking phase.

In this way, for example the technical advantage is brought about that the second route can be determined at different times. If the second route is for example determined temporally before or during or after an arrival of the motor vehicle at the motor vehicle drop-off area, i.e. before the end of the parking phase, for example the technical advantage is brought about that after the end of the parking phase the motor vehicle can be guided to the ascertained motor vehicle pickup area without temporal delays.

According to another specific embodiment, it is provided that the ascertaining of the motor vehicle pickup area includes the prediction of a respective time of arrival of the motor vehicle at each of the plurality of motor vehicle pickup areas, it being checked whether the corresponding motor vehicle pickup area is free at the respective predicted arrival time, and the pickup areas for the motor vehicle being selected from the motor vehicle pickup areas that are free at the respective predicted arrival time.

In this way, for example the technical advantage is brought about that the motor vehicle pickup area can be efficiently ascertained.

According to another specific embodiment, it is provided that the ascertained motor vehicle pickup area is identified as reserved in a digital occupancy state map of the parking facility.

In this way, for example the technical advantage is brought about that the ascertained motor vehicle pickup area is not used for another motor vehicle.

According to another specific embodiment, a signal is issued indicating that the ascertained motor vehicle pickup area is reserved.

In this way, for example the technical advantage is brought about that for example traffic participants inside the parking facility can be efficiently informed that the ascertained motor vehicle pickup area is reserved.

A signaling includes for example a visual and/or an acoustic signaling.

A signaling includes for example a sending of a message via a wireless and/or wire-bound communication network stating that the ascertained motor vehicle pickup area is reserved.

A signaling includes in particular a blocking of the ascertained motor vehicle pickup area by a physical object, for example a barrier.

A motor vehicle pickup area in the sense of the description is, or designates, an area inside the parking facility at which a motor vehicle is to be picked up after the end of an AVP process.

According to a specific embodiment, the motor vehicle drop-off area is situated within an entry area of the parking facility.

According to a specific embodiment, a motor vehicle pickup area or areas is/are situated inside an exit area of the parking facility.

According to another specific embodiment, the motor vehicle drop-off area is included in a motor vehicle pickup area.

According to a specific embodiment, it is provided that when there is a change of the state of occupancy of the ascertained motor vehicle pickup area, the determined second route is adapted in order to guide the motor vehicle to another free motor vehicle pickup area.

In this way, for example the technical advantage is brought about that an efficient reaction can be made to a change of the state of occupancy of the ascertained motor vehicle pickup area.

According to another specific embodiment, it is provided that the second route is determined in such a way that the motor vehicle also travels to one or more intermediate stations at which one or more service operations on the motor vehicle can be carried out, and/or at which the motor vehicle also makes an intermediate stop.

In this way, for example the technical advantage is brought about that the motor vehicle can be guided efficiently within the parking facility.

According to another specific embodiment, it is provided that when there is a change of the state of occupancy of the ascertained parking space, the determined first route can be adapted in order to guide the motor vehicle to another free parking space.

In this way, for example the technical advantage is brought about that an efficient reaction can be made to a change of the state of occupancy of the ascertained parking space.

According to another specific embodiment, it is provided that the first route is determined in such a way that the motor vehicle also travels to one or more intermediate stations at which one or more service operations on the motor vehicle can be carried out, and/or at which the motor vehicle also makes an intermediate stop.

In this way, for example the technical advantage is brought about that the motor vehicle can be guided efficiently within the parking facility.

According to a specific embodiment, it is provided that the system according to the present invention is set up or designed to execute or carry out the method according to the present invention.

According to a specific embodiment, it is provided that the method according to the present invention is executed or carried out by the system according to the present invention.

Technical functionalities of the method result analogously from corresponding technical functionalities of the system, and vice versa.

That is, in particular, system features result from corresponding method features, and vice versa.

According to a specific embodiment, a wireless communication network includes one of the following wireless communication networks: WLAN communication network, mobile radiotelephone network, LoRa network.

According to a specific embodiment, the monitoring device includes one or more environmental sensors.

In the sense of the present description, an environmental sensor is for example one of the following environmental sensors: video sensor, radar sensor, ultrasound sensor, lidar sensor, photoelectric sensor, pressure sensor, magnetic field sensor, infrared sensor.

The plurality of environmental sensors are for example situated so as to be spatially distributed within the parking facility.

According to a specific embodiment, the monitoring device is fashioned to monitor a state of occupancy of each of the plurality of motor vehicle pickup areas.

In the sense of the present description, an intermediate station is for example a parking space including a charging station for charging an electrical energy storage device of a motor vehicle.

In the sense of the present description, an intermediate station is for example a washing station for washing a motor vehicle.

In the sense of the present description, an intermediate station is for example a repair facility for repair and/or maintenance of a motor vehicle.

In the sense of the present invention, an intermediate station identifies for example an area within the parking facility that can be used for temporary parking of the motor vehicle. Such a temporary parking place is not a standard parking place in the sense of the present description. Such a temporary parking place is thus for example driven to only when the standard parking spaces are occupied.

In the sense of the present description, an intermediate station identifies for example an emergency stopping space, or an emergency stopping bay, or an escape bay, in which the motor vehicle can make an emergency stop or can be diverted. Such an intermediate station is advantageously used for example to divert the motor vehicle, or to improve the control of the flow of traffic within the parking facility.

For example, the motor vehicle can be temporarily parked in such an escape bay, or emergency stopping bay, until oncoming traffic has passed the motor vehicle.

According to a specific embodiment, the monitoring of the states of occupancy includes an ascertaining or estimation of the corresponding state of occupancy using a history of occupancy state data.

According to a specific embodiment, the states of occupancy are real-time states of occupancy.

A state of occupancy is one of the following states: free, occupied, reserved.

In a specific embodiment, it is provided that the determination of the route, i.e. for example of the first and/or the second route, is carried out as a function of one or more criteria, for example length, probable duration of travel along the route.

In this way, for example the technical advantage is brought about that the route can be efficiently determined.

The probable duration of travel is ascertained for example based on a history of data.

In a specific embodiment, the parking facility includes a plurality of motor vehicle drop-off areas. In a specific embodiment, it is provided that a state of occupancy of each of the plurality of motor vehicle drop-off areas is monitored, for example using the monitoring device. A specific embodiment includes the following step: ascertaining a motor vehicle drop-off area for the motor vehicle based on the monitoring of the state of occupancy of each of the plurality of motor vehicle drop-off areas, in order to select the motor vehicle pickup area at which the first route is to begin.

BRIEF DESCRIPTION OF THE DRAWINGS

FIG. 3 shows a parking facility for motor vehicles.

DETAILED DESCRIPTION

Figure 1:
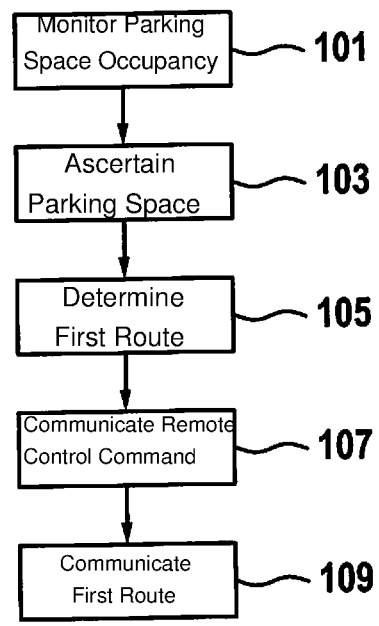
FIG. 1 shows a flow diagram of a method for supporting a driverless driving of a motor vehicle in a parking facility that has a plurality of parking spaces.

FIG. 1 shows a flow diagram of a method for supporting a driverless driving of motor vehicle in a parking facility that includes a plurality of parking spaces, including the following steps:

monitoring 101 of the state of occupancy of each of the plurality of parking spaces in order to ascertain free parking spaces, ascertaining 103 a parking space for the motor vehicle based on the monitoring of the state of occupancy of each of the plurality of parking spaces, so that a first route from a motor vehicle drop-off area of the parking facility to the ascertained parking space is determined 105 as a function of the monitoring of the state of occupancy of each of the plurality of parking spaces, communicating 107 remote control commands corresponding to the determined first route to the motor vehicle via a wireless communication network in order to guide the motor vehicle from the motor vehicle drop-off area to the ascertained parking space in at least partially remote-controlled fashion, and/or communicating 109 the determined first route to the motor vehicle via the wireless communication network so that the motor vehicle can drive from the motor vehicle drop-off area to the ascertained parking space in at least partially autonomous fashion based on the determined first route.

Figure 2:
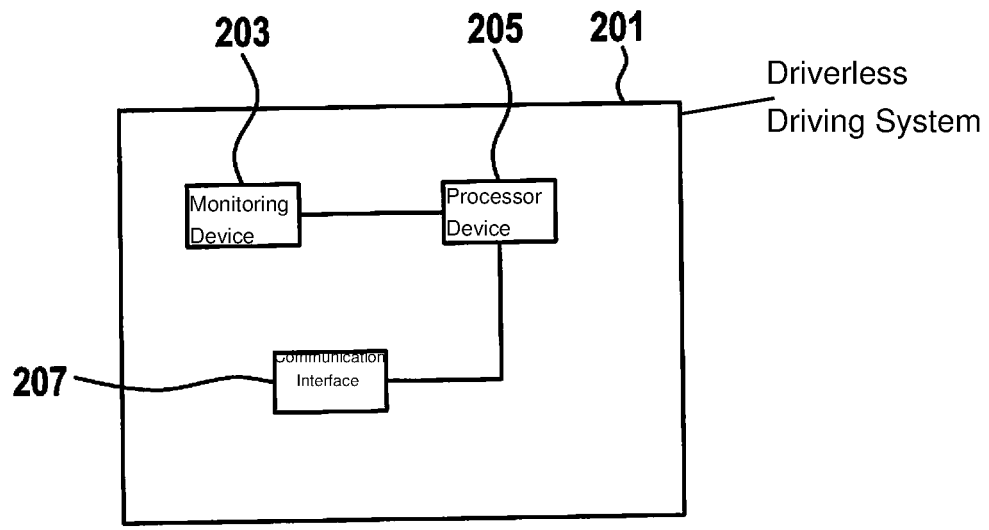
FIG. 2 shows a system for supporting a driverless driving of a motor vehicle in a parking facility that includes a plurality of parking spaces.

FIG. 2 shows a system 201 for supporting a driverless driving of a motor vehicle in a parking facility that has a plurality of parking spaces, including:

a monitoring device 203 for monitoring the state of occupancy of each of the plurality of parking spaces in order to ascertain free parking spaces, a processor device 205 for ascertaining a parking space for the motor vehicle based on the monitoring of the state of occupancy of each of the plurality of parking spaces, processor device 205 being designed to determine a first route from a vehicle drop-off area of the parking facility to the ascertained parking space as a function of the monitoring of the state of occupancy of each of the plurality of parking spaces, a communication interface 207 for communicating remote control commands corresponding to the determined first route to the motor vehicle via a wireless communication network in order to guide the motor vehicle from the vehicle drop-off area to the ascertained parking space in at least partially remote-controlled fashion, and/or communicating the determined first route to the motor vehicle via the wireless communication network, so that the motor vehicle can drive at least partially autonomously from the motor vehicle drop-off area to the ascertained parking space based on the determined first route.

FIG. 3 shows a parking facility 301 for motor vehicles.

Parking facility 301 includes system 201 according to FIG. 2; for clarity, only a symbolic rectangle is shown for system 201.

Parking facility 301 includes an entry 303 and an exit 305.

A motor vehicle drop-off area 307 is established immediately after entry 303.

Two motor vehicle pickup areas 309, 311 are established immediately before exit 305.

Parking facility 301 includes a plurality of parking spaces 313 for motor vehicles.

The state of occupancy of each of the plurality of parking spaces 313, of motor vehicle drop-off area 307, and of the two motor vehicle pickup areas 309, 311 is monitored by monitoring device 203.

In the context of an AVP process, it is provided for example that a driver leaves his vehicle within motor vehicle drop-off area 307. According to a specific embodiment, the motor vehicle is then guided in driverless fashion to one of the plurality of parking spaces 313, based on a first determined route. After the end of a parking phase, according to a further specific embodiment the motor vehicle is then guided in driverless fashion to one of the two motor vehicle pickup areas 309, 311, based on a second determined route. The driver then therefore picks up his motor vehicle either at motor vehicle pickup area 309 or at motor vehicle pickup area 311.

The determination of the first route and the determination of the second route are for example carried out in accordance with the embodiments described above and/or in the following.

According to a specific embodiment, the motor vehicle is guided from the motor vehicle drop-off area to a parking space, and after the end of a parking phase is guided to a motor vehicle pickup area.

According to a specific embodiment, one or more intermediate stations are provided.

For example, the motor vehicle can take the following path inside the parking facility:

motor vehicle drop-off area—parking space including a charging station—parking space—motor vehicle pickup area motor vehicle drop-off area—parking space—parking space including a charging station—parking space—motor vehicle pickup area motor vehicle drop-off area—parking space—parking space including a charging station—motor vehicle pickup area motor vehicle drop-off area—temporary intermediate area (for example because all parking spaces are occupied and/or parking traffic is too busy and/or oncoming traffic has the right-of-way)—parking space—motor vehicle pickup area That is, in particular, the first and/or second route for example includes these intermediate stations.

What is claimed is:

1. A method for supporting a driverless driving of a motor vehicle in a parking facility having a plurality of parking spaces, the method comprising:
monitoring, via a processor, a state of occupancy of each of the plurality of parking spaces to ascertain a free parking space;
ascertaining, via the processor, a parking space for the motor vehicle based on the monitoring of the state of occupancy of each of the plurality of parking spaces, so that a first route from a motor vehicle drop-off area of the parking facility to the ascertained parking space is determined as a function of the monitoring of the state of occupancy of each of the plurality of parking spaces; and
at least one of:
communicating at least one remote control command corresponding to the determined first route to the motor vehicle via a wireless communication network in order to guide the motor vehicle from the motor vehicle drop-off area to the ascertained parking space in at least a partially remote-controlled manner, and
communicating the determined first route to the motor vehicle via the wireless communication network so that the motor vehicle can drive from the motor vehicle drop-off area to the ascertained parking space in at least a partially autonomous manner based on the determined first route;
wherein a second route is determined so that the motor vehicle drives to at least one intermediate station at least one of: at which at least one service operation on the motor vehicle can be carried out, and at which the motor vehicle makes an intermediate stop.

2. The method as recited in claim 1, wherein the first route being is determined temporally before or during or after an arrival of the motor vehicle at the motor vehicle drop-off area.

3. The method as recited in claim 1, wherein the ascertaining of the parking space includes predicting a respective time of arrival of the motor vehicle at each of the plurality of parking spaces, wherein a check is performed as to whether the corresponding parking space is free at the respectively predicted arrival time, and wherein the parking space for the motor vehicle is selected from parking spaces that are free at the respectively predicted arrival time.

4. The method as recited in claim 1, further comprising: identifying the ascertained parking space as reserved in a digital occupancy state map of the parking facility.

5. The method as recited in claim 4, further comprising: issuing a signal indicating that the ascertained parking space is reserved.

6. The method as recited in claim 1, wherein the parking facility includes a plurality of motor vehicle pickup areas, each of which has an associated state of occupancy that is monitored, the method further comprising:
ascertaining a motor vehicle pickup area for the motor vehicle based on the monitoring of the state of occupancy of each of the plurality of motor vehicle pickup areas, so that a second route from the ascertained parking space to the ascertained motor vehicle pickup area is determined as a function of the monitoring of the state of occupancy of each of the plurality of motor vehicle pickup areas; and
at least one of:
communicating at least one remote control command corresponding to the determined second route to the motor vehicle via the wireless communication network to guide the motor vehicle from the ascertained parking space to the ascertained motor vehicle pickup area in at least partially remote-controlled manner, and
communicating the determined second route to the motor vehicle via the wireless communication network so that, based on the determined first route, the motor vehicle can drive from the ascertained parking space to the ascertained motor vehicle pickup area in at least partially autonomous manner;
wherein the second route is determined so that the motor vehicle drives to at least one intermediate station at least one of: at which at least one service operation on the motor vehicle can be carried out, and at which the motor vehicle makes an intermediate stop.

7. The method as recited in claim 6, wherein the second route is determined temporally before or during or after an arrival of the motor vehicle one of at the motor vehicle drop-off area and at an end of the parking phase.

8. The method as recited in claim 6, wherein the ascertaining of the motor vehicle pickup area based on the monitoring of the state of occupancy of each of the plurality of motor vehicle pickup areas includes predicting a respective arrival time of the motor vehicle at each of the plurality of motor vehicle pickup areas, a check being performed as to whether the corresponding motor vehicle pickup area is free at the respectively predicted arrival time, and wherein the motor vehicle pickup area the motor vehicle is selected from the motor vehicle pickup areas that are free at the respectively predicted arrival time.

9. The method as recited in claim 6, wherein the ascertained motor vehicle pickup area is identified as reserved in a digital state occupancy map of the parking facility.

10. The method as recited in claim 9, further comprising: issuing a signal indicating that the ascertained motor vehicle pickup area is reserved.

11. The method as recited in claim 6, further comprising: adapting the determined second route in response to a change of the state of occupancy of the ascertained motor vehicle pickup area, to guide the motor vehicle to another free motor vehicle pickup area.

12. The method as recited in claim 1, further comprising: adapting the determined first route in response to a change of the state of occupancy of the ascertained parking space, to guide the motor vehicle to another free parking space.

13. The method as recited in claim 1, wherein the first route is determined as a function of at least one criterion.

14. The method as recited in claim 13, wherein the at least one criterion includes one of a length along the first route and a probable travel duration along the first route.

15. A system for supporting a driverless driving of a motor vehicle in a parking facility having a plurality of parking spaces, comprising:
a monitoring device for monitoring a state of occupancy of each of the plurality of parking spaces to ascertain a free parking space;
a processor device for ascertaining a parking space for the motor vehicle based on the monitoring of the state of occupancy of each of the plurality of parking spaces, so that a first route from a motor vehicle drop-off area of the parking facility to the ascertained parking space is determined as a function of the monitoring of the state of occupancy of each of the plurality of parking spaces; and
a communication interface for at least one of:
communicating at least one remote control command corresponding to the determined first route to the motor vehicle via a wireless communication network in order to guide the motor vehicle from the motor vehicle drop-off area to the ascertained parking space in at least a partially remote-controlled manner, and
communicating the determined first route to the motor vehicle via the wireless communication network so that the motor vehicle can drive from the motor vehicle drop-off area to the ascertained parking space in at least a partially autonomous manner based on the determined first route;
wherein a second route is determined so that the motor vehicle drives to at least one intermediate station at least one of: at which at least one service operation on the motor vehicle can be carried out, and at which the motor vehicle makes an intermediate stop.

16. A parking facility for motor vehicles, comprising:
a system for supporting a driverless driving of a motor vehicle in a parking facility having a plurality of parking spaces, including:
a monitoring device for monitoring a state of occupancy of each of the plurality of parking spaces to ascertain a free parking space;
a processor device for ascertaining a parking space for the motor vehicle based on the monitoring of the state of occupancy of each of the plurality of parking spaces, so that a first route from a motor vehicle drop-off area of the parking facility to the ascertained parking space is determined as a function of the monitoring of the state of occupancy of each of the plurality of parking spaces; and
a communication interface for at least one of:
communicating at least one remote control command corresponding to the determined first route to the motor vehicle via a wireless communication network to guide the motor vehicle from the motor vehicle drop-off area to the ascertained parking space in at least a partially remote-controlled manner, and
communicating the determined first route to the motor vehicle via the wireless communication network so that the motor vehicle can drive from the motor vehicle drop-off area to the ascertained parking space in at least a partially autonomous manner based on the determined first route including the system;

wherein a second route is determined so that the motor vehicle drives to at least one intermediate station at least one of: at which at least one service operation on the motor vehicle can be carried out, and at which the motor vehicle makes an intermediate stop.

17. A non-transitory computer readable medium having a computer program, which is executable by a processor, comprising:

a program code arrangement having program code for supporting a driverless driving of a motor vehicle in a parking facility having a plurality of parking spaces, by performing the following:

monitoring a state of occupancy of each of the plurality of parking spaces to ascertain a free parking space;

ascertaining a parking space for the motor vehicle based on the monitoring of the state of occupancy of each of the plurality of parking spaces, so that a first route from a motor vehicle drop-off area of the parking facility to the ascertained parking space is determined as a function of the monitoring of the state of occupancy of each of the plurality of parking spaces; and at least one of:

communicating at least one remote control command corresponding to the determined first route to the motor vehicle via a wireless communication network to guide the motor vehicle from the motor vehicle drop-off area to the ascertained parking space in at least a partially remote-controlled manner, and communicating the determined first route to the motor vehicle via the wireless communication network so that the motor vehicle can drive from the motor vehicle drop-off area to the ascertained parking space in at least a partially autonomous manner based on the determined first route;

wherein a second route is determined so that the motor vehicle drives to at least one intermediate station at least one of: at which at least one service operation on the motor vehicle can be carried out, and at which the motor vehicle makes an intermediate stop.

\* \* \* \* \*